(12) United States Patent
Kim et al.

(10) Patent No.: US 7,088,772 B2
(45) Date of Patent: Aug. 8, 2006

(54) METHOD AND APPARATUS FOR UPDATING MOTION VECTOR MEMORIES

(75) Inventors: Kyeong Joong Kim, Seoul (KR); Hyun Soo Kang, Seoul (KR); Jae Won Chung, Seoul (KR)

(73) Assignee: Hyundai Electronics Industries Co., Ltd, Kyungki-do (KR)

( * ) Notice: Subject to any disclaimer, the term of this patent is extended or adjusted under 35 U.S.C. 154(b) by 857 days.

(21) Appl. No.: 09/789,231

(22) Filed: Feb. 20, 2001

(65) Prior Publication Data

US 2001/0031004 A1  Oct. 18, 2001

(30) Foreign Application Priority Data

Feb. 22, 2000 (KR) .................................. 2000-8512

(51) Int. Cl.
*H04N 7/12* (2006.01)
*H04N 11/02* (2006.01)
(52) U.S. Cl. .............................. 375/240.16; 375/240.12
(58) Field of Classification Search ........... 375/240.16, 375/240.12, 240.01, 240.02; 348/699, 14.01, 348/14.13
See application file for complete search history.

(56) References Cited

U.S. PATENT DOCUMENTS

| 5,515,114 | A  |   | 5/1996  | Murata |
|-----------|----|---|---------|--------|
| 5,909,513 | A  | * | 6/1999  | Liang et al. ................. 382/253 |
| 5,973,742 | A  |   | 10/1999 | Gardyne et al. |
| 6,351,493 | B1 | * | 2/2002  | Reed et al. ............ 375/240.13 |
| 6,519,287 | B1 | * | 2/2003  | Hawkins et al. ....... 375/240.16 |

FOREIGN PATENT DOCUMENTS

JP        11-69358        3/1999

\* cited by examiner

*Primary Examiner*—Gims Philippe
*Assistant Examiner*—Erick Rekstad
(74) *Attorney, Agent, or Firm*—Merchant & Gould P.C.

(57) ABSTRACT

A method and apparatus for updating motion vector memories used for prediction of motion vectors in a video compression coding/decoding method and system. For a frame composed of N macroblocks in the horizontal direction, only (2N+1) motion vector memories are used to store all motion vectors necessary to motion prediction, and only three memories per macroblock are used to update motion vectors, thereby reducing the size of a circuitry, the amount of computation and the amount of power consumed.

3 Claims, 10 Drawing Sheets

METHOD AND APPARATUS FOR UPDATING MOTION VECTOR MEMORIES

BACKGROUND OF THE INVENTION

1. Field of the Invention

The present invention relates in general to the updating of motion vector memories used for prediction of motion vectors in a video compression coding/decoding method and system, and more particularly to a method and apparatus for updating motion vector memories wherein, for a frame composed of N macroblocks in the horizontal direction, only (2N+1) motion vector memories are used to store all motion vectors necessary to motion prediction, and only three memories per macroblock are used to update motion vectors, thereby reducing the size of a circuitry, the amount of computation and the amount of power consumed.

2. Description of the Prior Art

Generally, video signal compression coding and decoding can desirably reduce the capacity of a memory necessary for storing video information as well as enable the transmission of the video information over a low-rate channel. In this regard, such compression coding and decoding techniques occupy a very important part of the multimedia industry requiring a variety of video applications such as video storage, video transmission, etc. On the other hand, the standardization of such information compression techniques has been required for the enlargement of the multimedia industry and the compatibility of information. In order to meet this requirement, video standards have been proposed up to the present on the basis of a variety of applications. For example, representative video coding/decoding standards may be H.261 of ITU-T (International Telecommunication Union—Telecommunication Standardization Sector) for transmitting video information for a video phone, video conferencing and the like via an ISDN (Integrated Service Digital Network), H.263 of ITU-T for transmitting video information via a PSTN (Public Switched Telephone Network), MPEG-1 of ISO/IEC JTC1/SC29/WG11 (International Standardization Organization/International Electrotechnical Commission Joint Technical Committee 1/Sub Committee 29/Working Group 11) MPEG (Moving Picture Experts Group) for storage of video in DSM (Digital Storage Media), and MPEG-2 for high definition digital broadcasting such as an EDTV (Enhanced Digital Television), HDTV (High Definition Television) and the like. A representative standard of still image signal compression coding techniques may be, for example, JPEG (Joint Photographic Coding Experts Group) of ISO/IEC JTC1/SC29/WG1.

FIG. 1 is a block diagram schematically showing the construction of a conventional digital video compression coding system. For efficient video compression coding, the method generally used for estimating a motion vector by referencing a reference frame for the coding of a current frame, performing a motion compensation prediction operation using the estimated motion vector and coding the resulting prediction error. With reference to FIG. 1, the conventional video compression coding system comprises a transform unit 11 for performing a transform operation for a frame difference between an input current frame and a motion compensation prediction frame obtained by a motion compensation predictor 61, a quantizer 31 for quantizing transform coefficients from the transform unit 11 for data compression, a variable length coder 41 for performing a variable length coding (VLC) operation for the transform coefficients quantized by the quantizer 31, a dequantizer 51 and an inverse transform unit 21. In this coding system, the frame difference is reconstructed by the dequantizer 51 and inverse transform unit 21 and applied to the motion compensation predictor 61 so that it can be used to obtain a prediction frame related to the next frame. The motion compensation predictor 61 performs a motion vector estimation operation using the input current frame and the reference frame and finds the prediction frame using an estimated motion vector. The motion vector estimated by the motion compensation predictor 61 is transferred to the variable length coder 41, which then variable length codes and transmits it together with the transform coefficients quantized by the quantizer 31. An image information bit stream output from the variable length coder 41 is transmitted to a receiver or a multiplexer for its multiplexing with other signals.

FIG. 2 is a block diagram schematically showing the construction of a conventional digital video compression decoding system. As shown in this drawing, a variable length decoder 42 performs a variable length decoding (VLD) operation for the transform coefficients and motion vector bit stream transmitted from the video compression coding system. The transform coefficients variable length decoded by the variable length decoder 42 are reconstructed by a dequantizer 22 and inverse transform unit 52 and applied to a motion compensation predictor 62. Also, the motion vector information variable length decoded by the variable length decoder 42 is applied directly to the motion compensation predictor 62 for use in motion compensation prediction. In other words, the digital video compression decoding system is adapted to receive information transmitted from the coding system and reconstruct the original frame on the basis of the received information. In order to reconstruct the same frame as that in the coding system, the decoding system must decode a received motion vector and perform a motion compensation prediction for the decoded motion vector.

In a general video coding method and system, motion prediction and compensation operations are not performed on a frame basis, but in the unit of a predetermined number of picture elements or pixels (M pixels in the horizontal direction and N pixels in the vertical direction, typically indicated by M×N pixels). This group of pixels is typically called a macroblock. It is generally prescribed that the macroblock be sized with 16 pixels in the horizontal direction and 16 pixels in the vertical direction (referred to hereinafter as "16×16"). In the present invention, although the size of the macroblock is not limited to a specific value, it will be described as 16×16 as an example for the convenience of description. A motion vector is two-dimensional information indicative of the quantity of motion of an object in the previous and current frames on an X-Y coordinate plane. Namely, the motion vector consists of a transversal motion value and a longitudinal motion value.

On the other hand, the motion prediction and compensation operations are performed on a macroblock basis. Namely, pixels in one macroblock are compensation-predicted using the same motion vector. In this regard, one motion vector is transmitted for the compensation prediction of each macroblock. However, there has recently been a need for video coding transmission at a very low bit-rate, resulting in studies of methods for effectively coding videos of low resolution. Representative methods are to estimate a motion vector on a smaller pixel group basis instead of the assumption that pixels in one macroblock have the same motion. For the latest very low bit-rate video coding standard, or H.263 of ITU-T, one macroblock is partitioned into four blocks of the same size, and the motion estimation and prediction operations are performed for each of the partitioned blocks together with the existing method for compensating for each macroblock on the basis of one motion vector. In the present invention, a macroblock mode where one motion vector per macroblock is transmitted will be referred to hereinafter as a 16×16 mode, and a macroblock mode where four motion vectors per macroblock are transmitted will be referred to hereinafter as an 8×8 mode.

As stated previously, a motion vector obtained by the motion compensation predictor is variable length coded by the variable length coder. The variable length coder represents a value with a higher generation frequency as a shorter code and a value with a lower generation frequency as a longer code, respectively. A motion vector has a close correlation with the surrounding blocks or macroblocks because of image characteristics. Accordingly, the coding efficiency can be increased by variable length coding a difference vector between a current motion vector and a motion vector predicted using motion vectors of the surrounding blocks or macroblocks, rather than directly variable length coding the current motion vector. The reason is that the difference vector is 0 or a value approximating 0 at a significantly high frequency.

FIG. 3 is a view showing the position of a macroblock to be currently coded and the positions of the surrounding macroblocks used for the prediction of a motion vector of the macroblock to be currently coded. Generally, a predicted motion vector can be determined using adjacent motion vectors in the following manner. That is, the predicted motion vector is determined as the median value of motion vectors of three macroblocks, or the left macroblock MB_A, the upper macroblock MB_B and the upper right macroblock MB_C, around a macroblock (MB_X) to be currently coded. A difference vector between the determined predicted motion vector and the current motion vector is obtained and then variable length coded. This method is typically used in ITU-T H.263 and ISO/IEC MPEG-4.

FIG. 3 illustrates motion vectors of the left, upper and upper right blocks or macroblocks around a macroblock to be currently coded, when the current macroblock is in the 16×16 mode. In this drawing, MVa can be interpreted to be of two types. It represents a motion vector of the left macroblock if the left macroblock is in the 16×16 mode, and a motion vector of an upper right block of the left macroblock if the left macroblock is in the 8×8 mode. Similarly, MVb represents a motion vector of the upper macroblock if the upper macroblock is in the 16×16 mode, and a motion vector of a lower left block of the upper macroblock if the upper macroblock is in the 8×8 mode. Similarly, MVc represents a motion vector of the upper right macroblock if the upper right macroblock is in the 16×16 mode, and a motion vector of a lower left block of the upper right macroblock if the upper right macroblock is in the 8×8 mode.

FIGS. 4a to 4d are views illustrating the motion vectors MVa, MVb and MVc when the current macroblock in FIG. 3 is in the 8×8 mode. FIG. 4a illustrates the motion vectors MVa, MVb and MVc when a block to be currently coded is an upper left block of the current macroblock, FIG. 4b illustrates the motion vectors MVa, MVb and MVc when the block to be currently coded is an upper right block of the current macroblock, FIG. 4c illustrates the motion vectors MVa, MVb and MVc when the block to be currently coded is a lower left block of the current macroblock, and FIG. 4d illustrates the motion vectors MVa, MVb and MVc when the block to be currently coded is a lower right block of the current macroblock. The point of difference of the 8×8 macroblock mode from the 16×16 macroblock mode in FIG. 3 is that the motion vectors MVa, MVb and MVc are defined differently according to the position of the block (not a macroblock) to be currently coded and even the motion vector of the macroblock to be currently coded is used. Similarly to FIG. 3, in the case where the block to be currently coded is an upper left block of the current macroblock, the motion vector MVa represents a motion vector of the left macroblock if the left macroblock is in the 16×16 mode, and a motion vector of an upper right block of the left macroblock if the left macroblock is in the 8×8 mode.

The main object of the motion vector prediction is to efficiently code a current motion vector using a similarity among motion vectors of adjacent macroblocks or blocks. However, additional memories must be provided to reference motion vectors of the surrounding macroblocks or blocks. Further, complex processes are required to update and reference the memories. As a result, provided that the motion estimator and motion compensator are implemented into hardware modules or ASICs (Application Specific Integrated Circuits) using the memories, the complexity and power consumption will be increased. Furthermore, in conventional techniques, for the updating of motion vector memories, motion vectors of all macroblocks of one frame are individually stored or all motion vectors of one slice (corresponding to a row of one macroblock) are stored at a time, thereby increasing the amount of computation in terms of software and the size and complexity of a circuitry and the amount of power consumed in terms of hardware.

SUMMARY OF THE INVENTION

Therefore, the present invention has been made in view of the above problems, and it is an object of the present invention to provide a method and apparatus for updating motion vector memories wherein motion vectors to be referenced in upper blocks are stored in memories on a column basis and updated on a row basis, and a motion vector to be referenced in a left block is stored in a separate memory and updated on a macroblock basis, thereby reducing the amount of memory use and making the storage and referencing processes simple, resulting in a reduction in power consumption.

It is another object of the present invention to provide a method and apparatus for efficiently performing a motion vector prediction operation of a motion compensation process of a video coding/decoding method and system.

In accordance with one aspect of the present invention, the above and other objects can be accomplished by the provision of a method for updating motion vector memories for prediction of motion vectors, comprising the steps of a) storing a motion vector of an upper right block in a current macroblock in a left motion vector memory; and b) storing motion vectors of a lower left block and lower right block in the current macroblock in an upper motion vector memory.

Another aspect of the present invention provides a motion vector memory updating apparatus comprising a left motion vector memory for storing a motion vector of an upper right block in a current macroblock; and an upper motion vector memory for storing motion vectors of a lower left block and lower right block in the current macroblock.

A further aspect of the present invention provides a method for predicting motion vectors for digital video decoding, comprising the steps of a) determining whether a current macroblock has been motion prediction-coded; b) determining whether the current macroblock is in an 8×8 mode if it is determined at the step a) that the current macroblock has been motion prediction-coded; c) receiving four motion vector differences if it is determined at the step b) that the current macroblock is in the 8×8 mode; d) predicting a motion vector of an upper left block of the current macroblock and obtaining an actual motion vector of the upper left block on the basis of the predicted motion vector and a corresponding one of the four motion vector differences; e) predicting a motion vector of an upper right block of the current macroblock and obtaining an actual motion vector of the upper right block on the basis of the predicted motion vector and a corresponding one of the four motion vector differences; f) predicting a motion vector of a lower left block of the current macroblock and obtaining an actual motion vector of the lower left block on the basis of the predicted motion vector and a corresponding one of the four motion vector differences; g) predicting a motion vector of a lower right block of the current macroblock and obtaining an actual motion vector of the lower right block on the basis of the predicted motion vector and a corresponding one of the four motion vector differences; and h) storing the obtained motion vectors of the upper right block, lower left block and lower right block in a left motion vector memory, upper left motion vector memory and upper right motion vector memory, respectively.

Another aspect of the present invention provides a method for predicting motion vectors for digital video coding, comprising the steps of a) determining whether a current macroblock has been motion prediction-coded; b) determining whether the current macroblock is in an 8×8 mode if it is determined at the step a) that the current macroblock has been motion prediction-coded; and c) storing motion vectors of an upper right block, lower left block and lower right block of the current macroblock in a left motion vector memory, upper left motion vector memory and upper right motion vector memory, respectively, if it is determined at the step b) that the current macroblock is in the 8×8 mode.

Another aspect of the present invention provides a motion vector prediction apparatus comprising a motion vector decoder for receiving a motion vector bit stream and decoding motion vector differences from the received bit stream; a left motion vector memory for storing a motion vector of an upper right block in a current macroblock; an upper motion vector memory for storing motion vectors of a lower left block and lower right block in the current macroblock; a predicted motion vector detector for receiving motion vectors of blocks surrounding the current macroblock from the left and upper motion vector memories and motion vectors of blocks in the current macroblock from the motion vector decoder and obtaining predicted motion vectors on the basis of the received motion vectors; and an adder for adding the motion vector differences decoded by the motion vector decoder to the predicted motion vectors obtained by the predicted motion vector detector, respectively.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
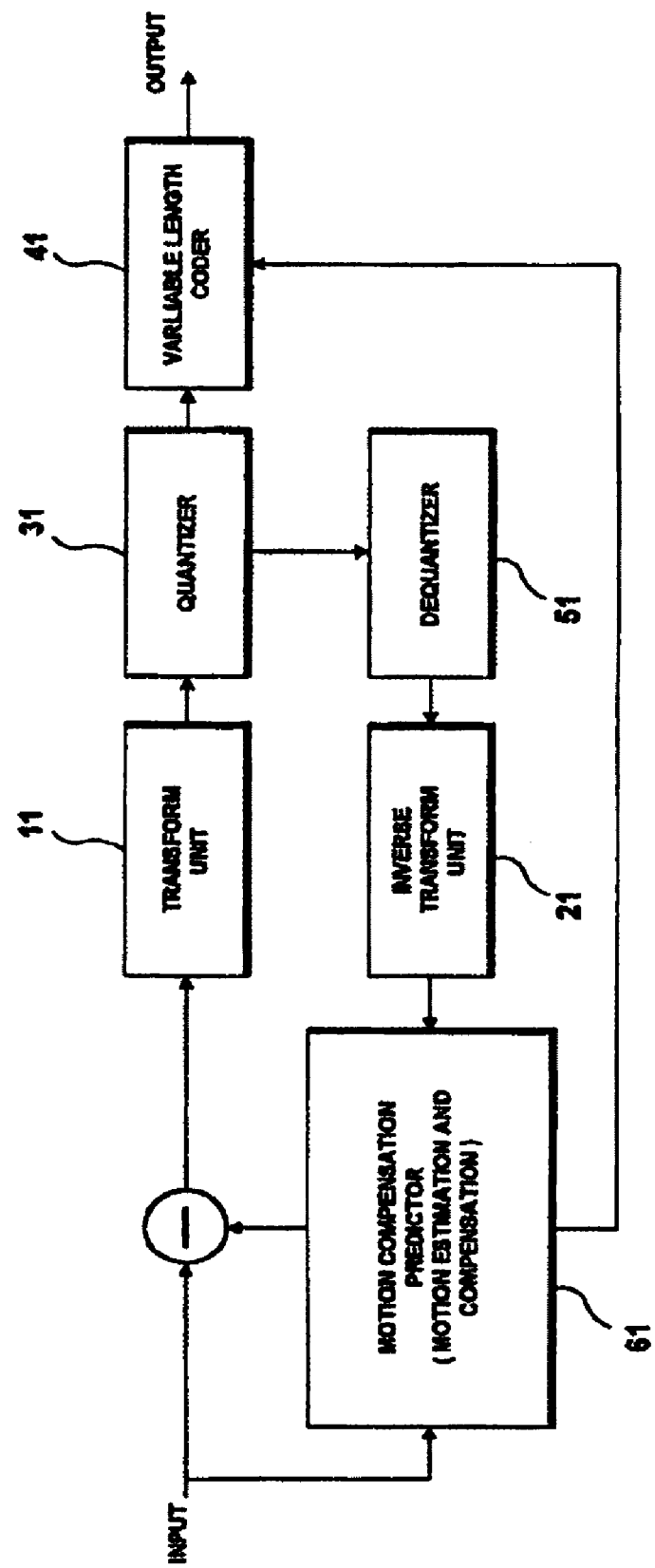
FIG. 1 is a block diagram schematically showing the construction of a conventional digital video compression coding system.
Figure 2:
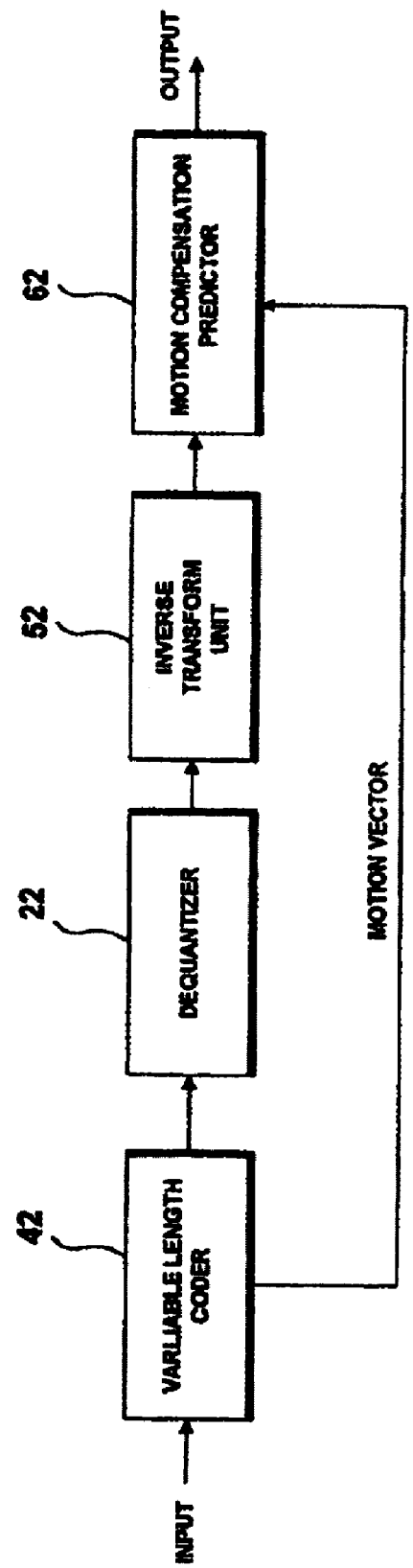
FIG. 2 is a block diagram schematically showing the construction of a conventional digital video compression decoding system.

Terms and abbreviations used in the specification can be defined as follows before describing the present invention in detail.

The "image" is a term used in a broad sense in the specification, which signifies both a digital still image and digital moving image. Also, the "moving image" and "video" are terms compatible with each other in the specification.

The reference character "MED( )" denotes a function for extracting the median value of elements in parentheses. For example, MED(1, 3, 7)=3.

The reference character "MVP" denotes a predicted motion vector obtained on the basis of the surrounding macroblocks.

The reference character "MVn (n=1, 2, 3 and 4)" denotes an nth block in a current macroblock. Namely, MV1 denotes an upper left block in the current macroblock, MV2 denotes an upper right block in the current macroblock, MV3 denotes a lower left block in the current macroblock and MV4 denotes a lower right block in the current macroblock.

The reference character "MVa" denotes a motion vector referenced in a block positioned at the left-hand side of a current macroblock or block.

The reference character "MVb" denotes a motion vector referenced in a block positioned above a current macroblock or block.

The reference character "MVc" denotes a motion vector referenced in a block positioned above the right-hand side of a current macroblock or block.

The reference character "MVD" denotes a motion vector difference.

Noticeably, a digital video decoding system is adapted to receive an image bit stream transmitted from a video compression coding system and reconstruct the same image as that in the coding system using the same motion vector prediction method as that in the coding system. In this regard, a motion vector memory updating method and apparatus of the present invention can be applied to both the coding and decoding methods and systems.

As stated previously, the variable length coding operation is performed to increase the coding efficiency in coding a motion vector in the video compression coding/decoding system. The motion vector can be efficiently coded as long as it approximates a zero vector, frequently occurring due to characteristics of the variable length coding. Generally, motion vectors of adjacent blocks or macroblocks in a frame have similar characteristics. In this regard, the coding efficiency can be increased by variable length coding a value of a current motion vector relative to adjacent motion vectors, namely, a prediction error of the current motion vector, rather than directly variable length coding the current motion vector. The reason is that the prediction error is a value approximating 0.

In a currently most widely used motion vector prediction method, a predicted motion vector is obtained on the basis of the median value of motion vectors of macroblocks or blocks adjacent to a current block or macroblock. The median value is obtained by considering a transversal motion value and longitudinal motion value of each motion vector, respectively.

Figure 3:
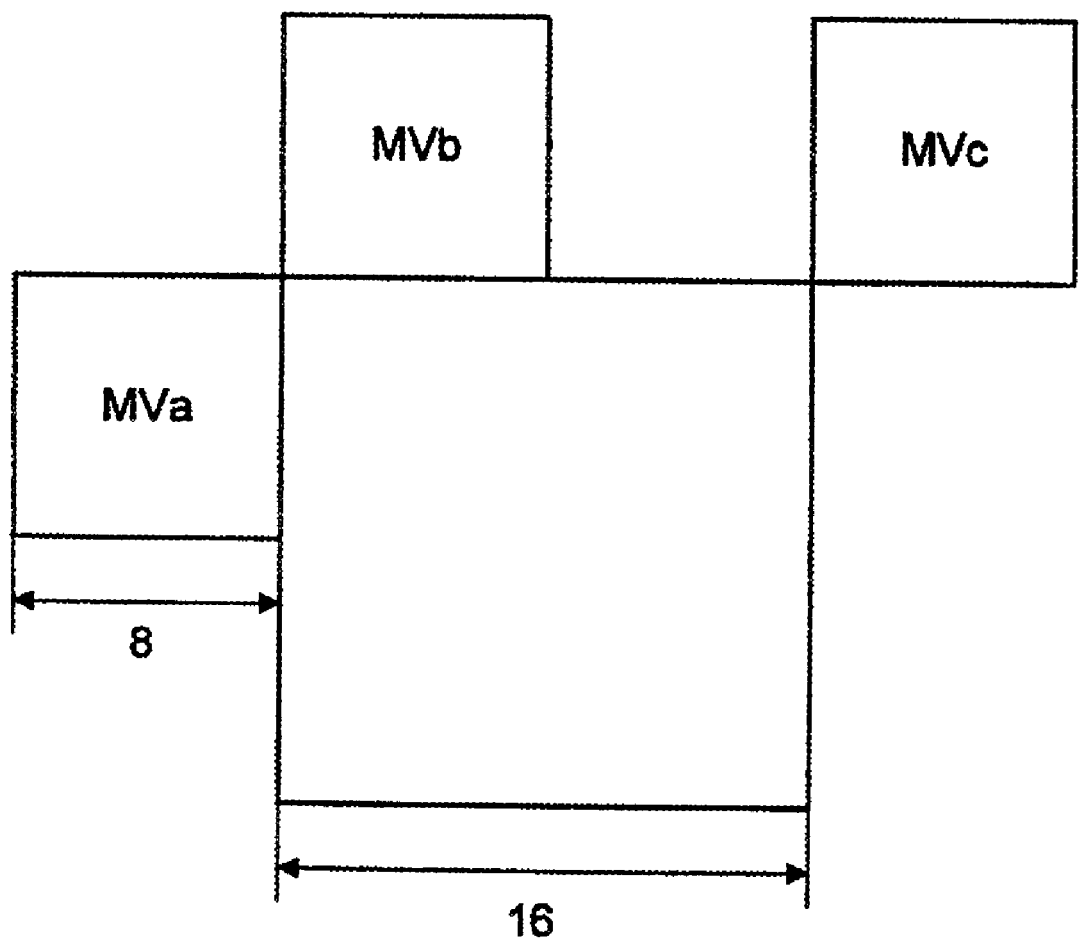
FIG. 3 is a view illustrating motion vectors of blocks around a macroblock to be currently coded, when the current macroblock is in a 16×16 mode.
Figure 4A:
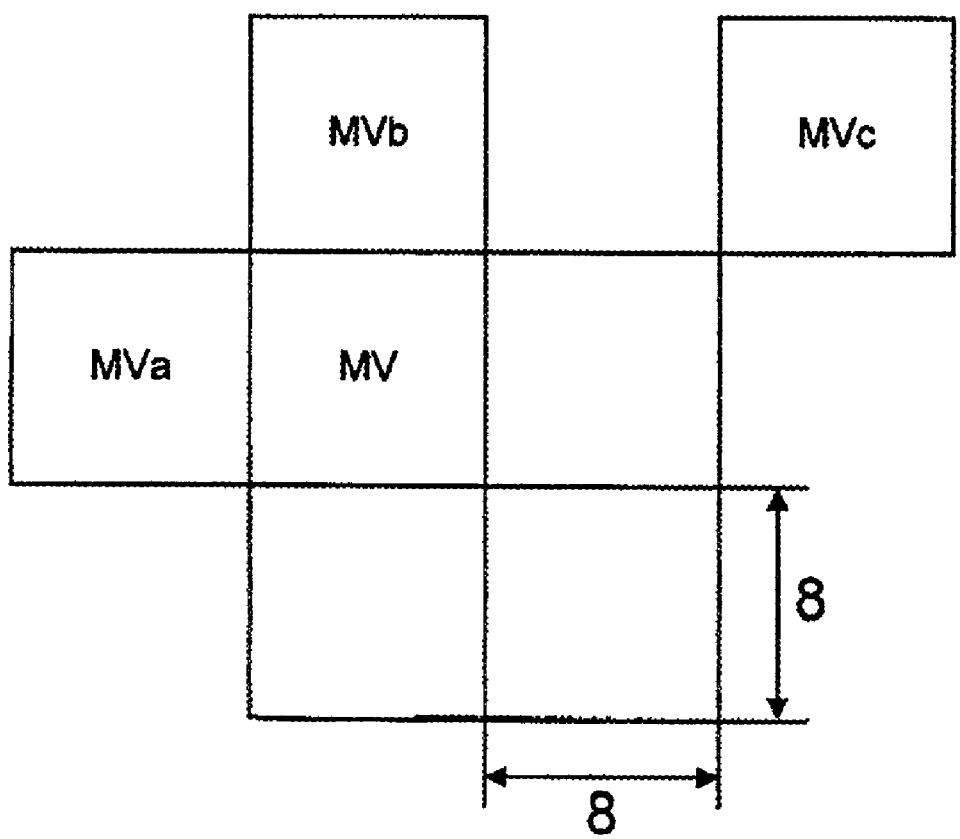
FIGS. 4a to 4d are views illustrating motion vectors of blocks around a macroblock to be currently coded, when the current macroblock is in an 8×8 mode.
Figure 4B:
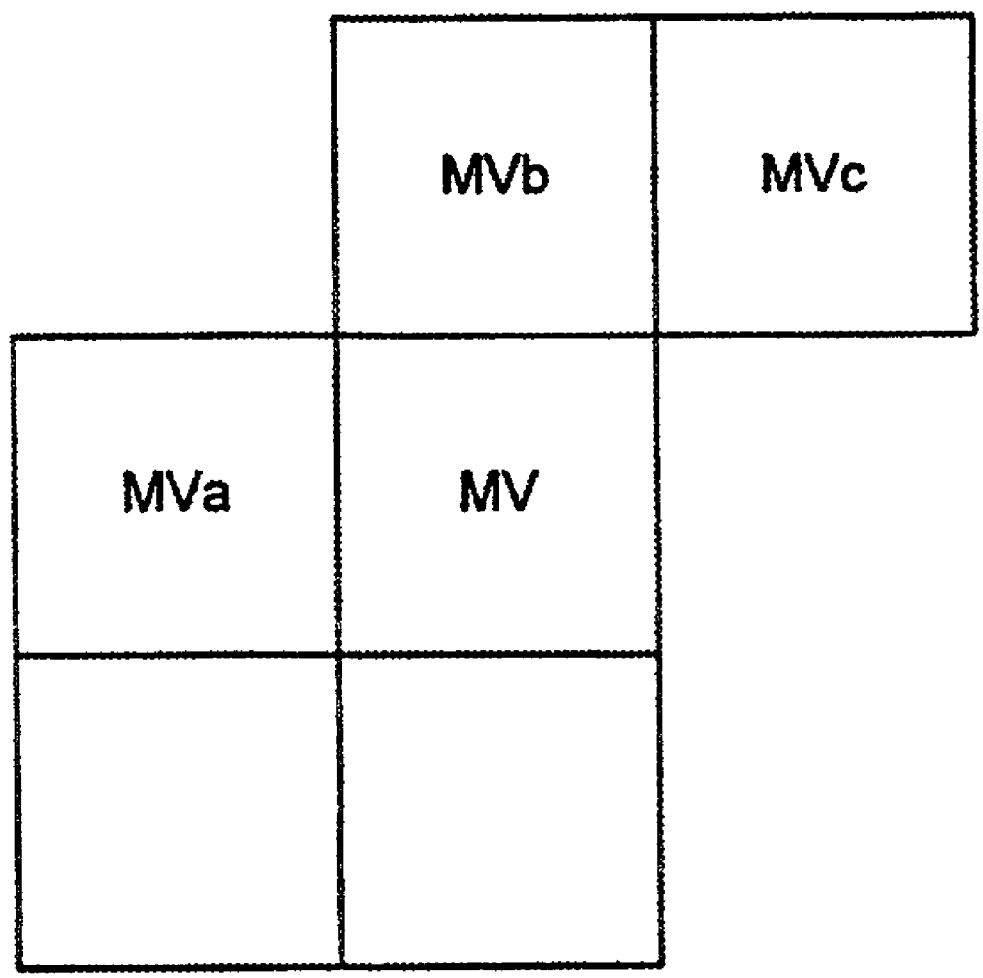
Figure 4C:
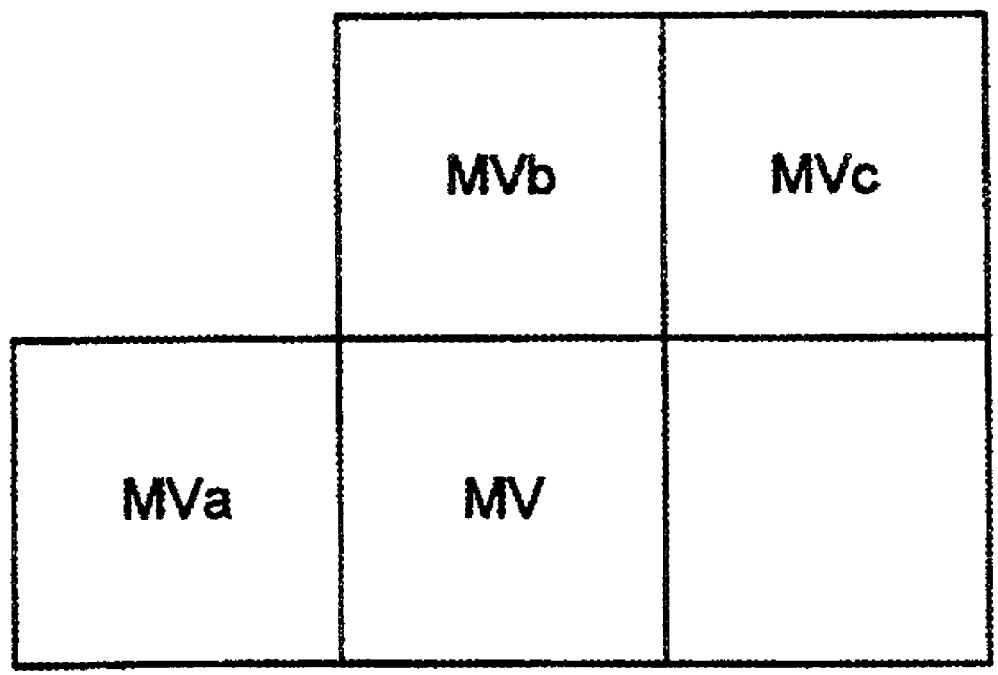
Figure 4D:
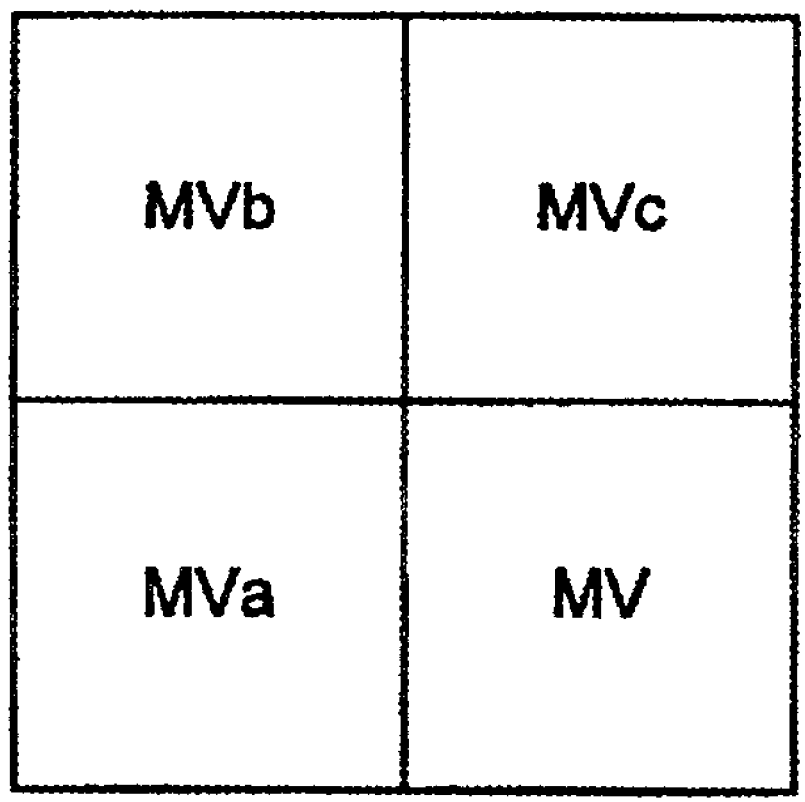

In an existing motion vector prediction method and apparatus, three surrounding blocks are referenced for prediction of a current motion vector. The three surrounding blocks are different in position according to macroblock-unit motion vector prediction and block-unit motion vector prediction. Herein, motion vectors of the three adjacent blocks are expressed as MVa, MVb and MVc, respectively. For the macroblock-unit motion vector prediction, the median value of the motion vectors MVa, MVb and MVc is obtained as a predicted motion vector by referencing motion vectors of adjacent blocks, as shown in FIG. 3. For the block-unit motion vector prediction, the median value of the motion vectors MVa, MVb and MVc is obtained as a predicted motion vector by referencing motion vectors of adjacent blocks and motion vectors of blocks in the same macroblock, as shown in FIG. 4.

In a coding method and system, after a predicted motion vector is obtained in the above manner, a motion vector difference (MVD), which is a difference between the actual motion vector and the predicted motion vector, is variable length coded and transmitted to a receiver. In a decoding method and system, a predicted motion vector is added to a motion vector difference decoded by a variable length decoder and the resulting motion-vector is actually used for motion compensation.

A motion vector, which is generated with respect to each block, must be stored in a motion vector memory for motion prediction of the next block. As stated previously, one motion vector per macroblock is generated for the macroblock-unit (16×16) motion prediction and four motion vectors per macroblock are generated for the block-unit (8×8) motion prediction. Motion vectors are stored in memories on a block basis. In the case where a macroblock whose motion vector is to be stored is motion-predicted in a 16×16 mode, motion vectors of four blocks constituting the macroblock are considered to be the same.

Figure 5:
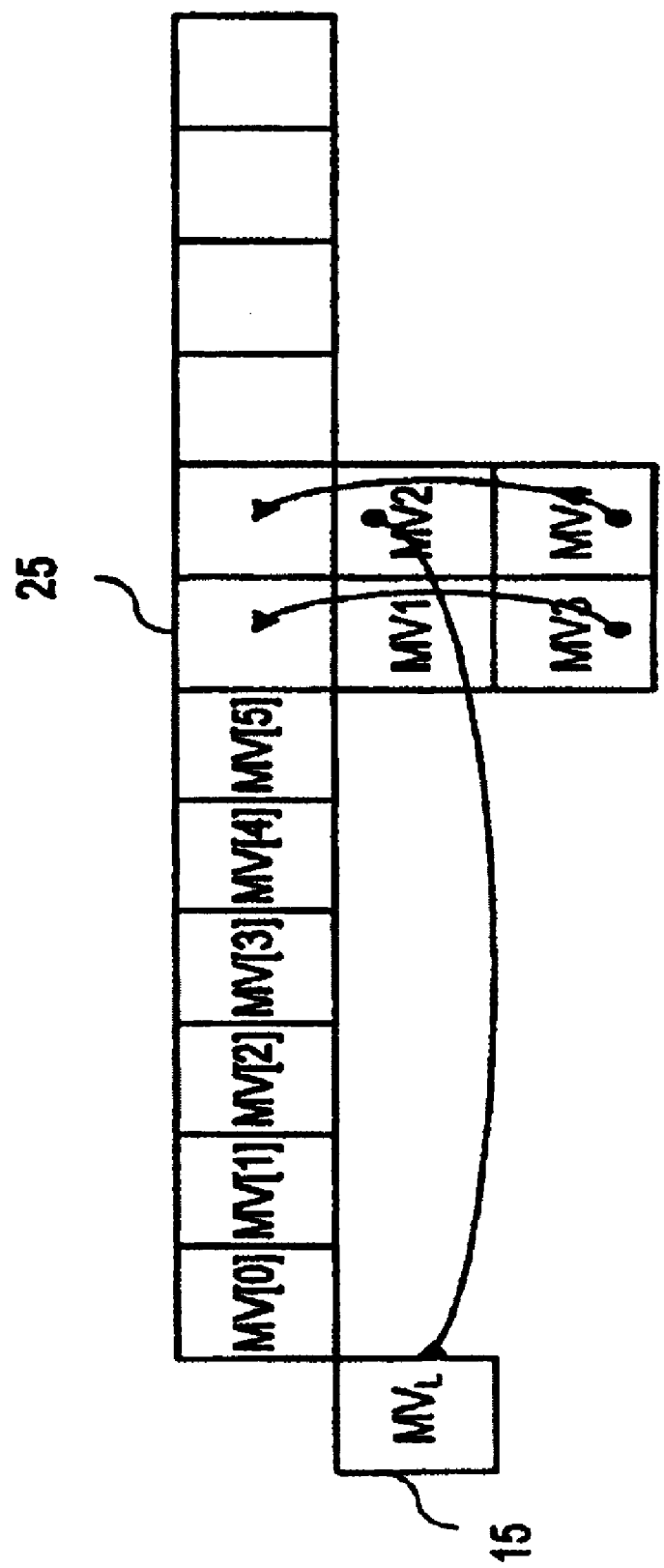
FIG. 5 is a view illustrating the principle of a method and apparatus for updating motion vector memories in accordance with the present invention.

FIG. 5 is a view illustrating the principle of a method and apparatus for updating motion vector memories in accordance with the present invention. As shown in this drawing, the motion vector memory updating apparatus of the present invention comprises a left motion vector memory 15 for storing a motion vector of an upper right block MV2 in a current macroblock, and an upper motion vector memory 25 for storing motion vectors of a lower left block MV3 and lower right block MV4 in the current macroblock. The left motion vector memory 15 includes a storage unit MVL for storing one motion vector, and the upper motion vector memory 25 includes storage units MV[0], . . . , MV[2N−1] for storing 2N motion vectors in consideration of a situation that the upper part of a frame is sized with N macroblocks in the horizontal direction and each of the macroblocks is in an 8×8 mode. In this regard, the motion vector memory updating apparatus of the present invention requires motion vector memories capable of storing 2N+1 motion vectors under the condition that a frame is composed of N macroblocks in the horizontal direction.

Next, the motion vector memory updating method of the present invention will be described with reference to FIG. 5. For the updating of motion vector memories, a motion vector of an upper right block (MV2 in FIG. 5) in a current macroblock is stored in the left motion vector memory $MV_L$ 15 and then referenced for the prediction of a motion of the subsequent macroblock (right macroblock). Motion vectors of a lower left block (MV3 in FIG. 5) and lower right block (MV4 in FIG. 5) in the current macroblock are stored in the upper motion vector memory 25 and then referenced for prediction of a motion vector of a macroblock of the next row. For example, for a macroblock of the nth column on the frame, a motion vector of a lower left block MV3 is stored in a motion vector memory MV[2n] and a motion vector of a lower right block MV4 is stored in a motion vector memory MV[2n+1]. Accordingly, in the present invention, only three motion vector memories $MV_L$, MV[2n] and MV[2n+1] are updated whenever a macroblock of the nth column is processed.

Figure 6:
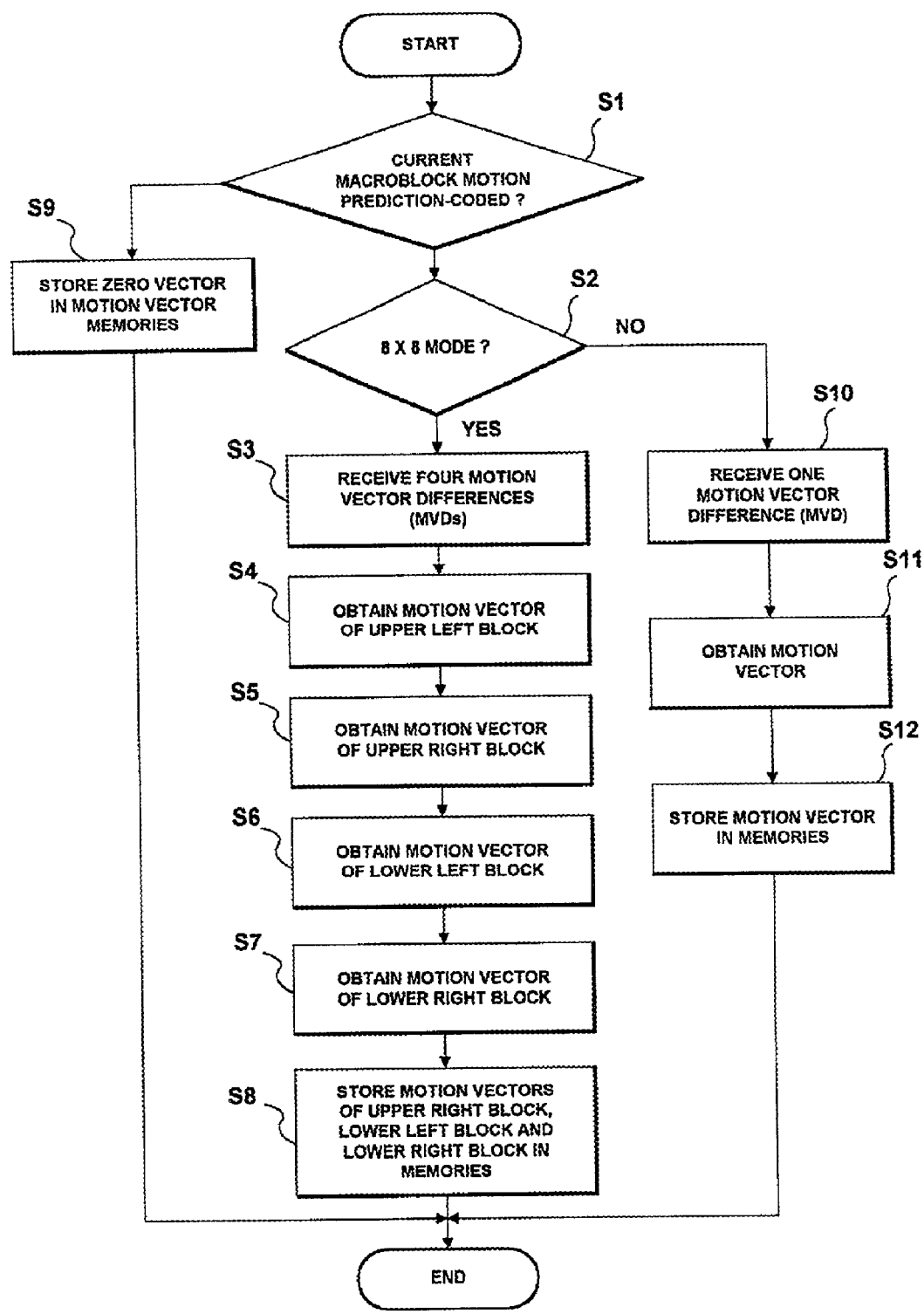
FIG. 6 is a flowchart illustrating a motion vector prediction method in accordance with the present invention.

FIG. 6 is a flowchart illustrating a motion vector prediction method to which the motion vector memory updating method of the present invention is applied for video decoding. In the preferred embodiment of the present invention, the motion vector prediction method is performed to predict a motion vector of a current macroblock positioned on the nth column of a frame, as an example.

For motion vector prediction by the present method, at the first step S1, a determination is made as to whether the current macroblock has been motion prediction-coded. The second step S2 is performed if the current macroblock has been motion prediction-coded, and, otherwise, the ninth step S9 is performed. For a general video coding technique, the motion prediction coding method is used together with an intra coding method provided against inaccurate motion prediction. In the intra coding method, a motion vector need not be transmitted because the motion information-based prediction operation is not performed. Further, a motion vector need not be transmitted if it is a zero vector. The motion prediction coding at the above first step S1 signifies that a motion vector is transmitted. This information of the current macroblock is transmitted as overhead information, which is decoded by a decoder.

At the second step S2, a determination is made as to whether the current macroblock is in the 16×16 mode or in the 8×8 mode. This determination is made on the basis of overhead information which is received and decoded into mode information.

At the third step S3, four motion vector differences are received if it is determined at the above second step S2 that the current macroblock is in the 8×8 mode. A variable length decoder in a decoding system receives those motion vector differences.

At the fourth step S4, a motion vector of an upper left block in the current macroblock is predicted and the actual motion vector of the upper left block is obtained on the basis of the predicted motion vector. It should be noted herein that the obtaining of a predicted motion vector MVP is not limited to a particular method. For example, a predicted motion vector MVP1 may be determined to be the median value of motion vectors of three macroblocks, or left, upper and upper right macroblocks, surrounding a macroblock to be currently coded, as in the below equation 1. A motion vector MV1 is obtained by adding a motion vector difference MVD1 to the predicted motion vector MVP1.

$$MVP1 = MED(MV_L, MV[2n], MV[2n+2])  \quad \text{[Equation 1]}$$

$$MV1 = MVD + MVP1$$

At the fifth step S5, a predicted motion vector MVP2 of an upper right block in the current macroblock is obtained and a motion vector MV2 of the upper right block is then obtained on the basis of the predicted motion vector MVP2, as in the below equation 2.

$$MVP2 = MED(MV1, MV[2n+1], MV[2n+2])  \quad \text{[Equation 2]}$$

$$MV2 = MVD2 + MVP2$$

At the sixth step S6, a predicted motion vector MVP3 of a lower left block in the current macroblock is obtained and a motion vector MV3 of the lower left block is then obtained on the basis of the predicted motion vector MVP3, as in the below equation 3.

$$MVP3 = MED(MV[2n-1], MV1, MV2)  \quad \text{[Equation 3]}$$

$$MV3 = MVD3 + MVP3$$

At the seventh step S7, a predicted motion vector MVP4 of a lower right block in the current macroblock is obtained and a motion vector MV4 of the lower right block is then obtained on the basis of the predicted motion vector MVP4, as in the below equation 4.

$$MVP4 = MED(MV1, MV2, MV3)  \quad \text{(Equation 4)}$$

$$MV4 = MVD4 + MVP4$$

At the eighth step S8, motion vector memories are updated as in the below equation 5 and the process for the current macroblock is then ended. In detail, the motion vector memory updating operation is performed by storing the motion vector of the upper right block MV2 in the current macroblock in the left motion vector memory $MV_L$ and the motion vectors of the lower left block MV3 and lower right block MV4 in the current macroblock in the upper motion vector memories MV[2n] and MV[2n+1], respectively. In order to perform the motion vector memory updating operation in this manner, the left motion vector memory 15 must include one motion vector memory and the upper motion vector memory 25 must include the same number of motion vector memories as that of blocks horizontally arranged in a frame.

$$MV_L = MV2  \quad \text{[Equation 5]}$$

$$MV[2n] = MV3$$

$$MV[2n+1] = MV4$$

On the other hand, at the ninth step S9, in the case where it is determined at the above first step S1 that the current macroblock has not been motion prediction-coded, all the motion vector memories $MV_L$, MV[2n] and MV[2n+1] are set to 0 (zero vector) and the process for the current macroblock is ended.

At the tenth step S10, one motion vector difference is received if it is determined at the above second step S2 that the current macroblock is not in the 8×8 mode. This motion vector difference is received by the variable length decoder in the decoding system.

At the eleventh step S11, a motion vector of each block in the current macroblock is predicted and the actual motion vector of each block is obtained on the basis of the predicted motion vector. It should be noted herein that the obtaining of a predicted motion vector is not limited to a particular method. For example, a predicted motion vector may be determined to be the median value of motion vectors of macroblocks surrounding a current macroblock as in the below equation 6.

$$MVP = MED(MV_L, MV[2n], MV[2n+2])  \quad \text{[Equation 6]}$$

$$MV = MVD + MVP$$

Finally, at the twelfth step S12, the motion vector memory updating operation is performed by storing the actual motion vector of the current macroblock obtained at the above eleventh step S11 in all of the left motion vector memory, upper left motion vector memory and upper right motion vector memory, as in the below equation 7. Then, the process for the current macroblock is ended.

$$MV[2n]=MV[2n+1]=MV_L=MV  \quad \text{[Equation 7]}$$

The motion vector memory updating method described above with reference to FIG. 6 is applied to the digital video decoding method. Further, this updating method may be applied to a digital video coding method if it is subjected to some modification. In the video decoding method, a motion vector difference is decoded from a received motion vector difference bit stream, a predicted motion vector is obtained and the actual motion vector is decoded by adding these two values. After the motion vector is decoded, it is stored in a motion vector memory in an appropriate manner. However, in the coding method, a motion vector to be stored in a motion vector memory need not be subjected to such a decoding process as in the decoding method because it is already known. As a result, only the motion prediction coding operation is performed to obtain a motion vector difference to be variable length coded.

A description will hereinafter be given of a motion vector prediction method in the case where the motion vector memory updating method of the present invention is applied to the video compression coding method. For video coding, a motion vector of a current macroblock positioned on the nth column of a frame is predicted in the following manner. First, a determination is made as to whether the current macroblock has been motion prediction-coded. Then, a determination is made as to whether the current macroblock is in an 8×8 mode if the current macroblock has been motion prediction-coded. If the current macroblock is in the 8×8 mode, the motion vector memory updating operation is performed by storing motion vectors of an upper right block, lower left block and lower right block of the current macroblock in a left motion vector memory, upper left motion vector memory and upper right motion vector memory, respectively. Then, the process for the current macroblock is ended.

On the other hand, if it is determined that the current macroblock has not been motion prediction-coded, a zero vector is stored in a motion vector memory associated with the current macroblock and the process for the current macroblock is then ended.

In the case where it is determined that the current macroblock is not in the 8×8 mode, a motion vector of the macroblock is stored in all of the left motion vector memory, upper left motion vector memory and upper right motion vector memory.

Figure 7:
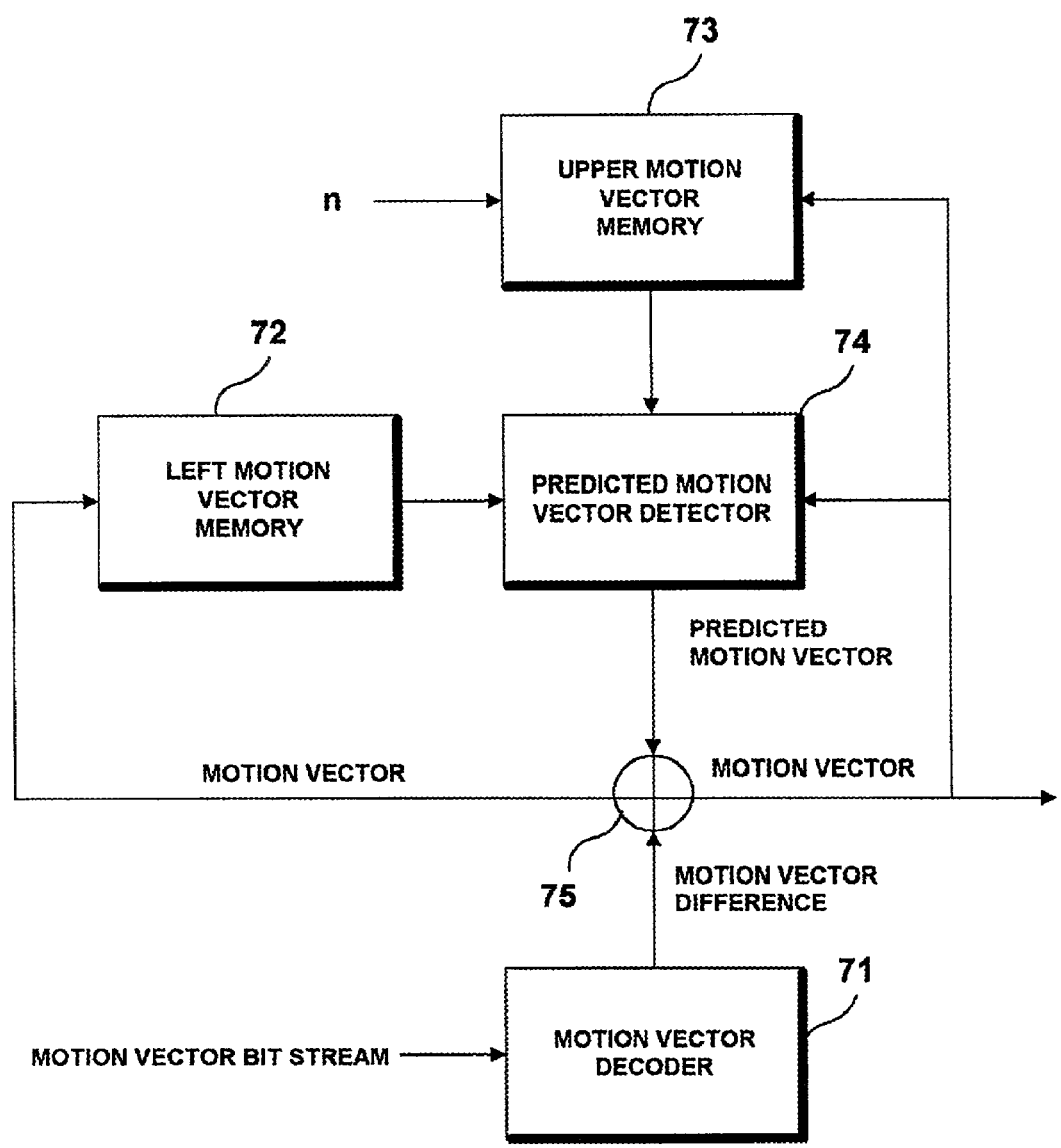
FIG. 7 is a block diagram showing the construction of a motion vector predictor in accordance with the present invention.

FIG. 7 is a block diagram showing the construction of a motion vector predictor in accordance with the present invention. As shown in this drawing, the motion vector predictor comprises a motion vector decoder 71 for receiving a motion vector bit stream and decoding motion vector differences MVD from the received bit stream, a left motion vector memory 72 for storing a motion vector MV2 of an upper right block in a current macroblock, an upper motion vector memory 73 for storing motion vectors MV3 and MV4 of a lower left block and lower right block in the current macroblock, a predicted motion vector detector 74 for receiving motion vectors of blocks surrounding the current macroblock from the left and upper motion vector memories 72 and 73 and motion vectors of blocks in the current macroblock from the motion vector decoder 71 and obtaining predicted motion vectors on the basis of the received motion vectors, and an adder 75 for adding the motion vector differences decoded by the motion vector decoder 71 to the predicted motion vectors obtained by the predicted motion vector detector 74, respectively.

The operation of the motion vector predictor with the above-stated construction in accordance with the present invention will hereinafter be described in detail.

First, the motion vector decoder 71 receives a motion vector bit stream and extracts motion vector differences MVD from the received bit stream. The left motion vector memory 72 stores a motion vector MV2 of an upper right block in a current macroblock. The left motion vector memory 72 preferably includes one motion vector memory for storing one motion vector. The upper motion vector memory 73 stores motion vectors MV3 and MV4 of a lower left block and lower right block in the current macroblock. The upper motion vector memory 73 preferably includes the same number of motion vector memories as that of blocks horizontally arranged in a frame.

The predicted motion vector detector 74 receives motion vectors MV of blocks surrounding the current macroblock from the left and upper motion vector memories 72 and 73 and motion vectors of blocks in the current macroblock from the motion vector decoder 71 and obtains predicted motion vectors MVP on the basis of the received motion vectors. Although not limited to a specific method, the predicted motion vector detector 74 determines the median value of the received motion vectors as each predicted motion vector MVP. The adder 75 adds the motion vector differences MVD decoded by the motion vector decoder 71 to the predicted motion vectors MVP obtained by the predicted motion vector detector 74, respectively, and outputs the resultant values as the actual motion vectors MV. Then, a motion compensator (not shown in FIG. 7) in the video compression decoding system performs a motion compensation operation using each motion vector MV from the adder 75.

As apparent from the above description, the present invention provides a method and apparatus for updating motion vector memories wherein, for a frame composed of N macroblocks in the horizontal direction, only (2N+1) motion vector memories are used to store all motion vectors necessary to motion prediction, and only three memories per macroblock are used to update motion vectors, thereby reducing the size of a circuitry, the amount of computation and the amount of power consumed. Therefore, the present invention is significantly effective in implementing a low-power video codec essential to mobile communication terminals.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for updating motion vector memories for prediction of motion vectors, comprising the steps of:
   a) storing a motion vector of an upper right block in a current macroblock in a left motion vector memory including only one motion vector memory, such that the motion vector being referenced in a left block and being stored in a separate memory and updated on a macroblock basis; and
   b) storing motion vectors of a lower left block and lower right block in the current macroblock in an upper motion vector memory, such that the motion vectors being referenced in upper blocks and being stored on a column basis and updated on a row basis, the upper motion vector memory including the same number of motion vector memories as that of blocks horizontally arranged in a frame.

2. A motion vector prediction apparatus comprising:
   a motion vector decoder for receiving a motion vector bit stream and decoding motion vector differences from the received bit stream;
   a left motion vector memory for storing a motion vector of an upper right block in a current macroblock, such that the motion vector being referenced in a left block and being stored in a separate memory and updated on a macroblock basis, the left motion vector memory including only one motion vector memory;
   an upper motion vector memory for storing motion vectors of a lower left block and lower right block in the current macroblock, such that the motion vectors being referenced in upper blocks and being stored on a column basis and updated on a row basis, the upper motion vector memory includes the same number of motion vector memories as that of blocks horizontally arranged in a frame;
   a predicted motion vector detector for receiving motion vectors of blocks surrounding said current macroblook from said left and upper motion vector memories and motion vectors of blocks in said current macroblock from said motion vector decoder and obtaining predicted motion vectors on the basis of the received motion vectors; and
   an adder for adding said motion vector differences decoded by said motion vector decoder to said predicted motion vectors obtained by said predicted motion vector detector, respectively.

3. The motion vector prediction apparatus as set forth in claim 2, wherein said predicted motion vector detector is adapted to determine a median value of motion vectors of macroblocks or blocks surrounding said current macroblock as each of said predicted motion vectors.

* * * * *